United States Patent

Ouvrard et al.

[11] Patent Number: 5,913,505
[45] Date of Patent: Jun. 22, 1999

[54] MOVEMENT-TRANSMISSION APPARATUS USING A PIVOTING LEVER AND VALVE INCORPORATING SAID APPARATUS

[75] Inventors: Michel Ouvrard, Poissy; Claude Tallend, Boinvilliers, both of France

[73] Assignee: Aerospatiale Societe Nationale Industrielle, Paris Cedex, France

[21] Appl. No.: 09/089,543

[22] Filed: Jun. 3, 1998

[30] Foreign Application Priority Data

Jun. 9, 1997 [FR] France .................................. 97 07114

[51] Int. Cl.$^6$ ........................................ F16K 1/16
[52] U.S. Cl. .................... 251/303; 251/298; 251/336; 251/335.3
[58] Field of Search .................. 251/298, 303, 251/335.3, 336, 337

[56] References Cited

U.S. PATENT DOCUMENTS

| | | | |
|---|---|---|---|
| 3,181,559 | 5/1965 | Hipple et al. ........................ | 251/336 X |
| 3,534,620 | 10/1970 | Nielsen ................................. | 251/337 X |
| 3,875,921 | 4/1975 | Deboy et al. ........................ | 251/303 X |
| 4,085,952 | 4/1978 | Sharples .............................. | 251/298 |
| 4,269,359 | 5/1981 | Neiss ................................... | 251/303 X |
| 4,285,497 | 8/1981 | Guettel . | |
| 4,460,011 | 7/1984 | Huber, Jr. ............................ | 251/298 X |
| 4,477,051 | 10/1984 | Ben-Yehuda ........................ | 251/298 X |
| 4,630,641 | 12/1986 | Lacour . | |

FOREIGN PATENT DOCUMENTS

| | | |
|---|---|---|
| 0 725 245 | 8/1996 | European Pat. Off. . |
| 2 324 967 | 4/1977 | France . |
| 2 550 602 | 2/1985 | France . |
| 1 206 685 | 12/1965 | Germany . |
| 004100862 | 7/1992 | Germany ............................ 137/335.3 |

Primary Examiner—Denise L. Ferensic
Assistant Examiner—Meredith H. Schoenfeld
Attorney, Agent, or Firm—Oblon, Spivak, McClelland, Maier & Neustadt, P.C.

[57] ABSTRACT

In order to ensure transmission of low amplitude back-and-forth movements between, for example, the non-aligned control member (46) of an actuator (42) and the sealing flap (34) of a valve, a lever (30) mounted on a body (10) by means of a flexible strip (32) is used. Said flexible strip lies in the longitudinal axis of the lever (30) and is fastened inside a tubular section (22) of the body (10) at two diametrically opposed points. The sealing flap (34) is fitted to one end of the lever (30) and the control member (46) actuates the other end of the lever.

11 Claims, 2 Drawing Sheets

MOVEMENT-TRANSMISSION APPARATUS USING A PIVOTING LEVER AND VALVE INCORPORATING SAID APPARATUS

DESCRIPTION

1. Field of the Invention

The present invention relates to an apparatus designed to transmit movements between two members capable of being actuated by low amplitude back-and-forth movements in two non-aligned coplanar directions.

The invention also relates to a valve incorporating said movement transmission apparatus.

The invention may be applied to any type of valve and, more generally, to any movement transmission apparatus using a pivoting lever and initiating low amplitude movements, particularly where there is a need for loads of the lowest possible resistance that are reproducible and free of hysterisis, together with significant stiffness and resistance along the axis of the lever.

2. Background Art

In a first category of existing valves, the movements of the valve's sealing flap are driven by a linear actuator located in the axis of the sealing flap. More exactly, the sealing flap is mounted directly on the command rod of the actuator.

The advantage of this type of valve is that it is particularly simple and low-cost. However, such valves have certain drawbacks. The first of these is the inevitable presence of friction which gives rise to significant resistance loads that vary with time, and to hysterisis. Moreover, the fluid-containing components and the electrical components are inevitably juxtaposed, which may pose problems in the event of leaks.

In a different category of existing valves, the sealing flap is driven by a torque motor via a pivoting lever that has the sealing flap fitted to one end.

Valves of this type have the advantage of being less subject to friction and ensuring complete separation between the fluid-containing components and the electrical components. However, they are significantly more complex and more costly, particularly due to the use of a torque motor.

In the type 51-127 valves marketed by the MOOG company, which belong to the category of valves with pivoting lever and torque motor, the pivoting of the lever is obtained by mounting the lever inside the body of the valve using a flexible sheath.

This arrangement eliminates all friction. However, the use of a flexible sheath for pivoting the lever has the particular drawback that the resistance loads are the same in all directions perpendicular to the lever. Consequently, in order to maintain the lever efficiently in its pivoting axis when the valve is subjected to external loads in this direction, the sheath must be given significant stiffness and resistance. This inevitably results in significant resistance load in the pivoting direction. The power needed to actuate it is therefore relatively high, as is the valve response time.

DISCLOSURE OF THE INVENTION

The invention chiefly relates to a pivoting lever-type apparatus for transmitting movements between two members whose original design eliminates friction (and consequently hysterisis, thereby ensuring good reproducibility) and limits the power required to control the movement, while having a very short response time.

According to the invention this result is obtained by means of an apparatus for transmitting movements between two members capable of being actuated by low amplitude back-and-forth movements in two non-aligned coplanar directions, characterized by the fact that it comprises:

- a fixed body,
- a movable lever linking the two members,
- a flexible strip placed between the lever and the fixed body that, in the unflexed state, lies in a plane perpendicular to the plane containing the said directions and passing through a longitudinal axis of the lever.

The use of a suitably-oriented flexible strip ensures that the apparatus is free of friction, has loads of the lowest possible resistance that are reproducible and free of hysterisis in the pivoting direction, and has significant stiffness and resistance along the axis of the lever.

In the preferred embodiment of the invention the flexible strip connects the lever to sections of the fixed body located on either side of the lever.

The flexible strip may then be advantageously mounted in a tubular section of the fixed body and fastened at two diametrically opposed points. In this configuration, when the strip is unflexed the lever passes through the axis of the tubular section.

In order to give additional stiffness in the pivoting direction the flexible strip is preferably fastened to both the lever and the fixed body.

The invention also relates to a valve characterized by the fact that it comprises:

- a fixed body containing at least one valve seat,
- at least one movable lever whose central section is mounted onto the fixed body by means of a flat, flexible strip that, in its unflexed state, passes through a longitudinal axis of the lever,
- a linear actuator fitted with a control member that operates in conjunction with a first end of the lever and is capable of being actuated by low amplitude back-and-forth movements in a direction lying in a plane perpendicular to the plane of the flexible strip,
- a sealing flap mounted on a second end of the lever such that it presses on the valve seat when the flexible strip is in the unflexed state.

This type of valve has all the advantages due to the use of the movement-transmitting apparatus described above. Moreover, using a linear actuator simplifies the valve and reduces costs compared with the pivoting-lever valves in the prior art. Using a pivoting lever also confers the advantages associated with this technology, i.e. complete separation between the fluid-containing components and the electrical components and, in the present invention, total absence of friction.

In the preferred embodiment of the invention, in which the flexible strip is mounted in a tubular section of the fixed body, the second end of the lever is located in a chamber formed inside the fixed body and partially delimited by a leaktight bellows fitted between the lever and said tubular section.

The control member advantageously includes a pusher and elastic means operating in opposition on the first end of the lever such that the elastic means maintain the sealing flap pressed against the valve seat and such that the pusher is separated from the first end of the lever by a clearance when the linear actuator occupies a closed state of the valve. Because the elastic means are part of the movable components of the valve they are not included in the total load to be overcome by the actuator when controlling opening of the valve; this helps limits the power needed by the actuator as well as the response time.

It should be noted that this arrangement may be used to control several levers simultaneously with a single actuator (i.e. a valve simultaneously controlling the flow-rate of several fluids).

BRIEF DESCRIPTION OF THE DRAWINGS

A preferred embodiment of the invention will now be described as a non-limitative example. The description relates to the attached drawings where.

DETAILED DISCLOSURE OF A PREFERRED EMBODIMENT

Figure 1:
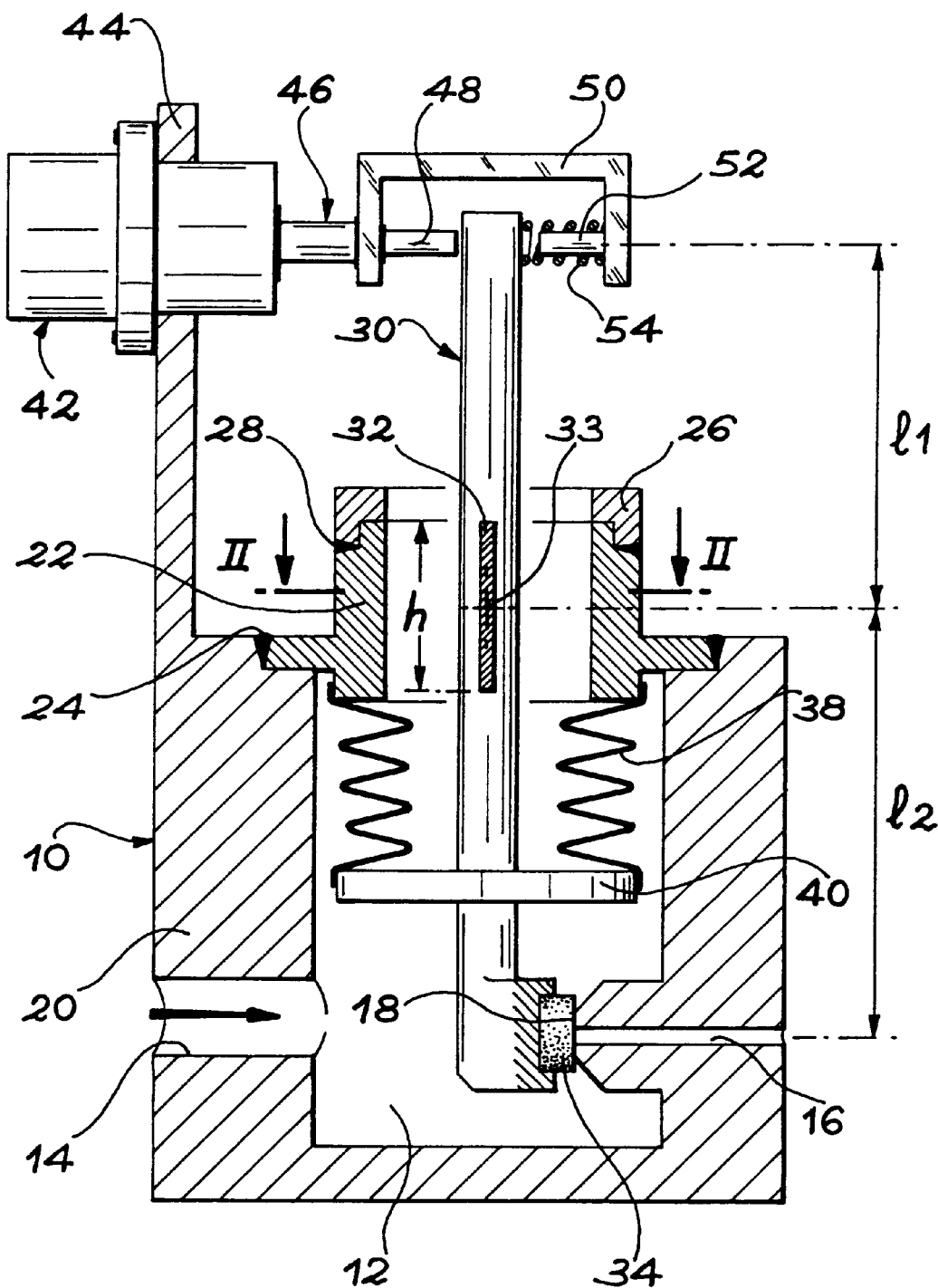
FIG. 1 is a longitudinal section through a valve constructed according to the invention; the valve is shown in the closed state.
Figure 3:
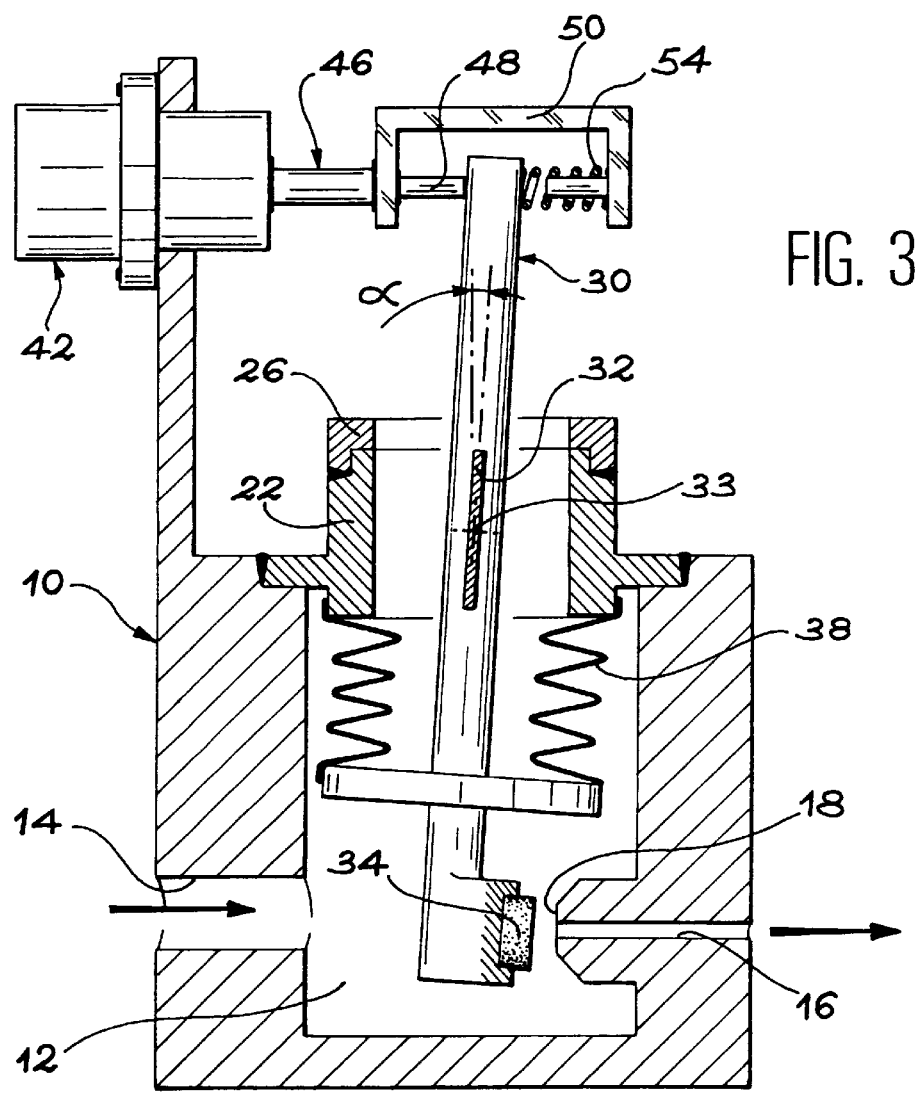
FIG. 3 is a similar view to that of FIG. 1, showing the valve in the open state.

FIGS. 1 and 3 respectively show a valve constructed according to the invention in the closed and open states. The valve incorporates a movement-transmission apparatus capable of being used in other mechanical systems in order to transmit movement between any two members actuated by low amplitude back-and-forth movements in two non-aligned coplanar directions.

The valve shown in the figures comprises a fixed body 10 that encloses a chamber 12. A fluid inlet passage 14 is cut into body 10 so that it gives directly into chamber 12. Body 10 of the valve is also pierced to form a fluid outlet passage 16 that gives into chamber 12 via a valve seat 18.

As can be seen from FIGS. 1 and 3 in particular, body 10 of the valve comprises a main section 20 in which passages 14 and 16 as well as chamber 12 are formed. Chamber 12 is more or less cylindrical and passages 14 and 16 open radially into it.

Body 10 of the valve also comprises a tubular section 22 fitted to one end of chamber 12 and fastened to main section 20, for example by a weld 24. The outer surface of tubular section 22 is covered by a ring-shaped cap 26 whose function is described below. Said cap 26 is fastened to the tubular section 22 by a weld 28.

The axis of tubular section 22 of body 10 contains a movable lever 30 fastened to the tubular section 22 by means of a flexible strip 32 such that the lever pivots to a limited extent around a hypothetical axis 33 that is perpendicular to the longitudinal axis of the lever.

In the embodiment shown, movable lever 30 has the shape of a generally rectilinear cylindrical rod that passes through tubular section 22 as well as cap 26 of body 10 with a relatively high degree of clearance. When flexible strip 32 is in the flat, unflexed, state shown in FIGS. 1 and 2, movable lever 30 is coaxial with tubular section 12 and cap 26, and the plane of the strip is perpendicular to the axis of valve seat 18.

The end of movable lever 30 located inside chamber 12 is fitted with a sealing flap 34. More exactly, sealing flap 34 is mounted laterally on movable lever 30 on the same side as valve seat 18 such that the surface in contact with the valve seat in the closed position is parallel to the longitudinal axis of movable lever 30. Sealing flap 34 is thus normally pressed to form a leaktight seal against valve seat 18 when flexible strip 32 is in the unflexed state shown in FIG. 1.

Figure 2:
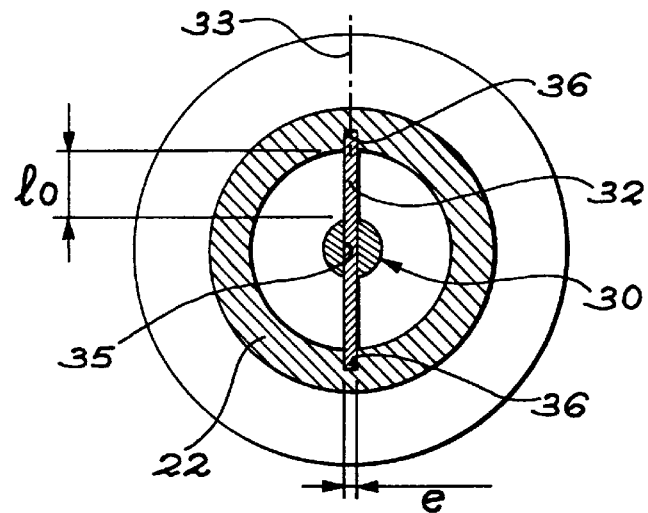
FIG. 2 is a view of a cross section along line II—II of FIG. 1.

As can be seen particularly from FIGS. 1 and 2, flexible strip 32 is a rectangular strip that passes without clearance through a slit 35 running along the longitudinal axis of the rod forming movable lever 30. The ends of the flexible strip 32 the furthest away from movable lever 30 are housed without clearance in grooves 36 cut into the inner cylindrical surface of tubular section 22 of body 10 at diametrically opposed points in relation to movable lever 30.

In order to give the movement-transmission apparatus thus constituted a high degree of rigidity in a direction perpendicular to the plane of flexible strip 32, the latter is rigidly fastened to movable lever 30 as well as to tubular section 22 on either side of the lever, for example by welds (not shown).

In the embodiment shown in the figures, cap 26 is used to maintain flexible strip 32 in the grooves 36 before the strip is fastened to the tubular section 22.

In order to create a leaktight seal between the chamber 12 and the exterior during pivoting of movable lever 30 around hypothetical axis 33, a leaktight bellows 38 is fitted between the two components. More exactly, a first end of leaktight bellows 38 is fastened to the tubular section 22 of body 10 and the other end is fastened to disk 40 which constitutes an integral part of movable lever 30. Said disk 40 is fitted between the tubular section 22 and the end of movable lever 30 bearing sealing flap 34. Leaktight bellows 38 thereby partially delimits the volume of chamber 12.

The valve according to the invention also comprises a linear actuator 42 fastened to body 10 so that it operates in conjunction with the external end of movable lever 30, i.e. the opposite end from that bearing sealing flap 34. More exactly, linear actuator 42 is mounted on a tab 44 of the main section 20 of body 10 such that its control member 46 moves in a direction perpendicular to the axis of movable lever 30 when the valve is in the closed state shown in FIG. 1.

Linear actuator 42 may, in particular, consist of a known type of electromagnetic actuator.

As shown particularly in FIGS. 1 and 3, control member 46 of linear actuator 42 comprises a pusher 48 capable of pressing laterally on the external end of movable lever 30 at the opposite end from that bearing sealing flap 34. More exactly, when linear actuator 42 is in a state in which the valve shown in FIG. 1 is closed and in which flexible strip 32 is in the unflexed state, there is a slight clearance between the end of pusher 48 and movable lever 30. When, on the other hand, linear actuator 42 moves to the state in which the valve is open, as shown in FIG. 3, pusher 48 takes up the clearance mentioned above and presses against the external end of movable lever 30 to pivot the lever around its hypothetical axis 33, twisting flexible strip 32 and distancing sealing flap 34 from valve seat 18.

Control member 46 of linear actuator 42 also comprises a bracket 50 that straddles the external end of movable lever 30. On the opposite side of movable lever 30 to that on which pusher 48 operates, said bracket 50 bears a centering pin 52 that is coaxial with the pusher and on which is fitted a compression spring 54. More exactly, compression spring 54 is fitted between movable lever 30 and bracket 50 on the same side as sealing flap 34.

When linear actuator 42 is in the position in which the valve is in closed state as shown in FIG. 1, compression spring 54 applies an additional load to movable lever 30 ensuring that the valve remains in the closed position, thereby maintaining leaktightness.

When linear actuator 42 is energized to control opening of the valve (FIG. 3), the compression spring 54 is not included in the total load to be overcome by the actuator since it is part of control member 46. The leaktightness of the valve in the closed position is thereby ensured without increasing the power needed to control opening of the valve.

In the valve described above, flexible strip 32 gives the best possible compromise between good resistance to external loads acting along hypothetical axis 33 and loads along the axis of the lever (due to the internal pressure of the valve acting on the bellows) and low resistance of movable lever 30 to pivoting movement around said axis. It should be noted that the thickness of flexible strip 32 may be constant, as in the attached figures, or varying to endow the system with certain desired characteristics.

Generally speaking, the achievement of optimal performances (i.e. the lowest possible electrical power and quickest response times) is conditional on optimizing the geometrical parameters of the movement-transmission apparatus composed of movable lever 30 mounted on flexible strip 32.

The ratio of the external and internal arms of movable lever 30 l1 and l2 respectively, on either side of hypothetical axis 33 of the movable lever 30 is optimized to obtain the best compromise between the load to be overcome by linear actuator 42 and the lifting of sealing flap 34. Minimum lifting of the sealing flap is usually selected so that the pressure losses in the vicinity of the valve seat are acceptable; this sets the ratio between the pivoting angle $\alpha$ of movable lever 30 during opening of the valve (FIG. 2) and the arm of the internal lever l2 of movable lever 30. A significant value is preferably then attributed to the ratio between the arms of the external and internal arms l1 and l2 of the lever in order to minimize the load to be overcome by the actuator. However, this increases the travel required by actuator 42 such that a compromise must be found in terms of the intended electrical power and response time.

The physical measurements of flexible strip 32 (i.e. its thickness e, its height h along the longitudinal axis of lever 30, and its width l0 between the lever 30 and tubular section 22, as seen in FIG. 2) are also optimized. This optimization is designed to bring the torsional moment proportional to $h.e^3 \cdot \alpha/l0$ required to bring the strip into the position in which the valve is open as shown in FIG. 3 down to acceptable values by reducing the loads to be overcome; to reduce the shearing stress proportional to $e \cdot \alpha/l0$ in flexible strip 32 created by said torsion by improving the resistance of the strip; and reducing the bending stress proportional to $l0/(e.h^2)$ in flexible strip 32 caused by the pressure of the fluid on bellows 38 by improving the resistance of the strip.

The best compromise consists in increasing the height h and width l0 of flexible strip 32 as much as possible and reducing the thickness e of the strip as much as possible consistent with its bending stress limit. The thickness e of the strip is cubed in the balance of loads the actuator needs to overcome, so that reducing this thickness gives considerably improves performances.

In the valve described above, movable lever 30 and flexible strip 32 form an apparatus that transmits low amplitude movement between control member 46 of linear actuator 42, actuated by a back-and-forth movement along the axis of pusher 48, and sealing flap 34, actuated by a back-and-forth movement along a circular trajectory centered around hypothetical axis 33.

As has already been seen, the movement-transmission apparatus is capable of being used in other applications to transmit movements between two members capable of being actuated by low amplitude back-and-forth movements in two non-aligned coplanar directions. From this point of view, it should be noted that although the movements of sealing flap 34 and control member 46 take place in two directions that are more or less parallel in the valve described, this characteristic is not imperative. Movable lever 30 may have a non-rectilinear shape that enables it to transmit movements between two members whose movements are coplanar but not parallel to one another.

We claim:

1. Apparatus designed to transmit movements between two members capable of being actuated by low amplitude back-and-forth movements in two non-aligned coplanar directions, said apparatus comprising:
    a fixed body,
    a movable lever linking the two members,
    a flexible strip placed between the lever and the fixed body that, in the unflexed state, lies in a plane perpendicular to the plane containing the said directions and passing through a longitudinal axis of the lever.

2. Apparatus of claim 1 wherein the flexible strip connects the lever to sections of the fixed body located on either side of the lever.

3. Apparatus of claim 2 wherein the flexible strip is mounted in a tubular section of the fixed body and fastened at two diametrically opposed points. In this configuration, when the strip is unflexed the lever passes through the axis of the tubular section.

4. Apparatus of claim 1 wherein the flexible strip is fastened to the lever and to the fixed body.

5. Valve comprising:
    a fixed body containing at least one valve seat,
    at least one movable lever whose central section is mounted onto the fixed body by means of a flat, flexible strip that, in its unflexed state, passes through a longitudinal axis of the lever,
    a linear actuator fitted with a control member that operates in conjunction with a first end of the lever and is capable of being actuated by low amplitude back-and-forth movements in a direction lying in a plane perpendicular to the plane of the flexible strip,
    a sealing flap mounted on a second end of the lever such that it presses on the valve seat when the flexible strip is in the unflexed state.

6. Valve of claim 5 wherein the flexible strip connects the lever to sections of the fixed body located on either side of the lever.

7. Valve of claim 6 wherein the flexible strip is mounted in a tubular section of the fixed body and fastened at two diametrically opposed points. In this configuration, when the strip is unflexed the lever passes through the axis of the tubular section.

8. Valve of claim 7 wherein the second end of the lever is located in a chamber formed inside the fixed body and partially delimited by a leaktight bellows fitted between the lever and said tubular section of the fixed body.

9. Valve of claim 8 wherein fluid inlet and outlet passages are formed in the fixed body and give into said chamber directly and via the valve seat respectively.

10. Valve of claim 5 wherein the flexible strip is fastened to the lever and to the fixed body.

11. Valve of claim 5 wherein the control member includes a pusher and elastic means operating in opposition on the first end of the lever such that the elastic means maintain the sealing flap pressed against the valve seat and such that the pusher is separated from the first end of the lever by a clearance when the linear actuator occupies a closed state of the valve.

* * * * *